United States Patent Office 3,734,845
Patented May 22, 1973

3,734,845
PROCESS TO IMPROVE THE EFFICIENCY OF PHOTOCHEMICAL REACTIONS
Jean-Claude Bravi, Pau, Claude Poulain, Orsay, and Claude Viallet, Pau, France, assignors to Society Anonyme dite: Aquitaine Total Organico, Paris, France
Filed Mar. 16, 1971, Ser. No. 124,720
Claims priority, application France, Mar. 17, 1970, 7009500; Jan. 21, 1971, 7101975
Int. Cl. B01j 1/10; C07c 3/24
U.S. Cl. 204—162 XM                  5 Claims

ABSTRACT OF THE DISCLOSURE

A process for the continuous preparation of cycloalkanone oximes by the action of nitrosyl chloride prepared in situ in a sulphuric medium on a liquid cycloalkane or a cycloalkane dissolved in an organic solution which is inert under the reaction conditions, under the effect of actinic radiation, characterized by the fact that, for a given concentration of oxime in the sulphuric medium, the minimum temperatures of the surfaces transmitting the light energy and in contact with the reactive mixture are made to vary in inverse proportion to the percentage weight of the sulphuric medium in the reactive mixture.

Figure 1:
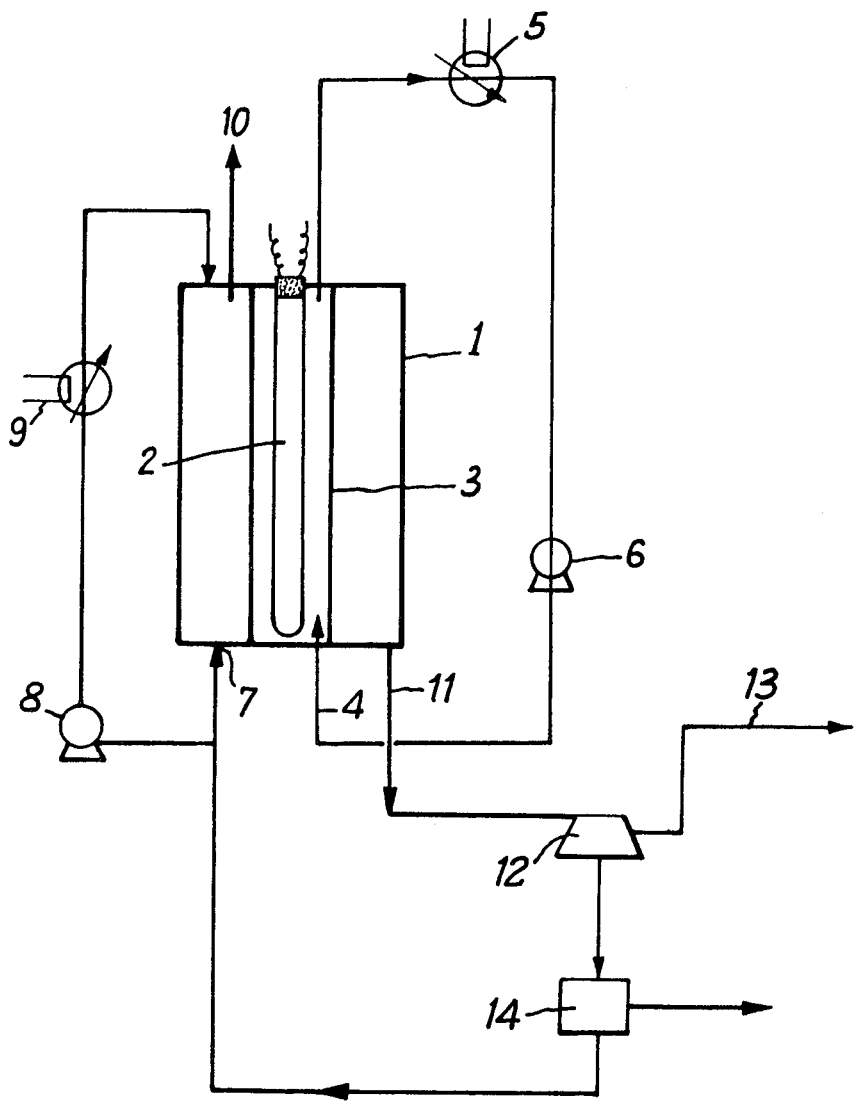

Application of the process to photo-oximation of cyclododecane, characterized by the fact that the reaction is carried out with preferably 15 to 35% weight of oxime in the sulphuric medium, and 4 to 15% weight of the sulphuric medium.

In photochemical reactions performed in the presence of a source emitting radiations, submerged or not in the reactive mixture, it is found after a certain time that output drops considerably, as the result of an adhesive, viscous film which is deposited on the surface in contact with the reactive mixture and through which the light energy is transmitted. When the source of radiation is submerged, the "contact surface" is the outside surface of the cooling cover of the lamp. When the source of radiation is outside the container, the same phenomenon occurs on the inside of the surface in contact with the reactive mixture, through which the light is transmitted and irradiation takes place.

In cycloalkane photo-oximation reactions in particular, whatever the type of souce used and the reactive mixture subjected to radiations, tar is deposited on the outside surface of the light source, hindering the passage of the light needed for the reaction, and consequently reducing the speed of reaction, which causes a significant drop in output and endangers the purity of the product obtained. This serious drawback is an obstacle to industrial use of the process on a continuous basis, and various methods of remedying it have been considered.

Methods already proposed to overcome this difficulty include, for instance, adding to the reactive mixture carboxylic acids, hydrochloric acid or halogenated ethers. It is also possible to provide for intermittent or continuous washing of the tar-covered surface by a flow of sulphuric or chlorosulphuric acid, for the addition to the reactive mixture of sulphuric acid, combined with rapid stirring, for the depositing of a transparent, inert layer of crystallized cycloalkane on the surface of the cover, or for the coating of the outer surface of the source of radiation with a transparent, waterproof subtsance, such as a resin or organopolysiloxane.

None of these measures provide a fully adequate solution to the problem, in the context of a continuous industrial process.

The object of the present invention is a simple, effective and inexpensive process to improve the efficiency of photochemical reactions with radiation sources submerged or not in the reactive mixture, and in particular cycloalkane photo-oximation reactions, by preventing viscous matter from adhering to the contact surface of the said source, matter which tends to become tar through degradation.

The process according to the invention consists of raising the temperature of the surface in contact with the reactive mixture to a level sufficient to make the viscous deposit fluid enough not to adhere to the said surface. One of the methods used to embody this process is to cause to circulate along the contact surface a calorie-generating fluid, warmer than the reactive mixture, enabling the temperature of the surface to be maintained at between −30 and +150° C., depending on the viscosity of the deposits. This fluid may be liquid or gas, or composed of a mixture of fluids that will give the required temperature at the level of the contact surface.

In addition, in the case of the photo-oximation reaction of cycloalkanes containing an organic medium and a sulphuric medium, dispersed in each other, heating of the surfaces transmitting the energy is regulated in accordance with the concentration of oxime in the sulphuric medium and the percentage of this sulphuric medium in the reactive mixture.

Obviously, heating of the contact surface must never affect the efficiency of the reaction by altering the optimum temperature for the reactive mixture. This can easily be controlled by suitable stirring, or a predetermined flow of the reactive mixture, or by the presence of a heat exchanger to compensate for the rise in temperature resulting from heating of the contact surface.

In the particular case of photo-oximation of cycloalkanes, the temperature of the surface may be between 20 and 95° C., which in no way alters the temperature of the reactive mixture, kept at around 15° C., since the photodegradable film forming on the contact surface has very low thermal conductivity. The conditions of stirring, flow and heat exchange remain identical with the conditions under which one operates without heating the cover.

Heating of the contact surface can be done indirectly by heat exchange, using a calorie-generating fluid as mentioned above, for instance, or by any other direct method, such as resistances, metal coating or other known system compatible with the material of which the surface is made and its transparency for radiation purposes.

Application of the process to photo-oximation of cycloalkanes involving an organic medium and a sulphuric medium dispersed in each other allows the temperature of the surface transmitting the light energy and in contact with the reactive mixture to be regulated according to the concentration of oxime in the sulphuric medium and the proportion of this sulphuric medium in the reactive mixture.

By organic medium is meant the medium consisting of the cycloalkane, whether liquid or dissolved in an organic solvent which is inert under the conditions of the reaction. The sulphuric medium contains the reagents needed to produce the nitrosing agent and extract the oxime produced, namely a sulphuric solution of nitrosyl-sulphuric acid saturated with hydrochloric acid.

One of the simplest methods to apply is to vary the proportion of sulphuric medium for a given oxime concentration, by changing the rate of drainage, and then raising the temperature of the contact surface to a level at which the sulphuric solution of oxime in contact with the surface will become fluid.

The sulphuric acid has several functions in photo-oximation reactions. It acts as a solvent for the nitrosyl-sulphuric acid fed into the reactor, to produce nitrosyl chloride in the presence of excess hydrochloric acid, and is also used to extract the oxime forming during the reaction in the reactive mixture. The highest concentration of oxime is obtained close to the surfaces transmitting the light energy, where the light flux is at its highest level.

It has been found, however, that the presence of surplus sulphuric acid reduces the productivity of the reaction and raises major problems during treatment of sulphuric effluents.

The aim is thus to obtain maximum productivity, without the emitting sources being coated with deposits and without any excess sulphuric acid. For this purpose, and in accordance with the present invention, a relation is established between the temperature of the surfaces transmitting the light energy and the percentage weight of sulphuric medium in the reactive mixture, for a given concentration of oxime in the sulphuric medium.

FIG. 1 is a diagrammatical representation of a cycloalkanone oxime production unit, which includes means of varying drainage rates and a system for heating the contact surface by heat exchange, and more specifically by circulating a calorie-generating fluid.

This very simplified unit consists of a reactor 1, which may be cylindrical, for instance, in which is submerged a high-pressure mercury lamp 2, with a double covering 3 inside which passes the calorie-generating fluid 4, recycled through a heat exchanger 5 and pump 6. The sulphuric medium and organic medium are fed continuously into the reactor through 7. The reactive mixture is kept stirred by the pump 8 and held at a reaction temperature of less than 15° C. by the exchanger 9. Gases insoluble in the reactive mixture are removed through an aperture 10. The reaction products involving an organic medium are drawn off at 11, and the sulphuric medium containing the oxime is separated from the organic medium by centrifugalization at 12. The sulphuric medium containing the oxime is completely or partly conveyed by 13 towards the transposition stage.

The organic phase is drained partly at 14 and recycled at 7.

This simplified diagram shows that for a given percentage of oxime in the sulphuric medium, determined by the concentration of the nitrosylsulphuric acid solution fed into the reactor at 7, drainage ratios can be varied easily, in order to determine the optimum proportion of sulphuric medium for the contact surface temperature, which can be regulated by adjusting the temperature of the calorie-generating fluid.

Tables I and II below, which are not restrictive, give the minimum temperatures of the calorie-generating fluid determining the temperature of the contact surface in relation to the percentage weight of sulphuric medium in the reactive mixture, for 25% weight of oxime in this sulphuric medium in Table I, and 35% weight of oxime in Table II.

TABLE I

| Percentage weight of sulphuric medium: | Minimum temperature of heating fluid, ° C. |
|---|---|
| 15% or above | 4 |
| 12% | 10 |
| 10% | 15 |
| 8% | 25 |
| 6% | 40 |
| 5% | 50 |
| 4% | 60 |

TABLE II

| Percentage weight of sulphuric medium: | Minimum temperature of heating fluid, ° C. |
|---|---|
| 15% or above | 10–15 |
| 12% | 25 |
| 10% | 35 |
| 7% | 70 |

The following conclusions can be drawn from experimental results:

The higher the concentration of oxime in the sulphuric medium, the greater is the viscosity of the deposits of sulphuric solutions of oxime, and the higher must be the temperature of the calorie-generating fluid to make the deposits fluid.

For lower concentrations of oxime in the sulphuric medium, photo-oximation can be carried out without the formation of deposits, in the presence of a small percentage of the sulphuric medium, and using a calorie-generating fluid at fairly low temperatures.

It is preferable, however, to increase the oxime content of the sulphuric medium in order to reduce the residual sulphuric effluents, and correspondingly raise the temperature of the contact surface.

The following examples, given for guidance but not restrictive, will illustrate the present invention.

EXAMPLE 1

The apparatus consists of a 500-litre cylindrical reactor, in the axis of which is placed a 20 kw. high-pressure mercury lamp, doped or not. This lamp, 90 mm. in diameter, is surrounded by a double cover, with an inner diameter of approximately 140 mm. and an outer diameter of approximately 150 mm. A calorie-generating fluid, such as water, flows through this space, in an upward direction.

A solution with 20% weight of cyclododecane in carbon tetrachloride is fed in continuously, at the same time as hydrochloric acid and a 75% solution of nitrosylsulphuric acid in 85% sulphuric acid. The reactive mixture is tested, and each of the reagents added in such a way as to ensure that the following conditions are maintained:

15% weight of sulphuric phase, containing 25% weight of oxime and 75% weight of aqueous sulphuric acid;
85% weight of organic medium, consisting of a solution of 20% cyclododecane in carbon tetrachloride.

The organic medium is saturated with hydrochloric acid and contains a sufficient percentage of nitrosyl chloride to ensure complete absorption of the light rays, namely about 3 g./litre.

The temperature of the reactive mixture is kept at a level of 15° C., or below, by means of stirring using a pump, with a capacity of 5 to 15 cu. m./hr., and recirculation through an outside heat exchanger.

With 1450 litres an hour circulating through the double casing, at 4° C. when entering and 15° C. on leaving, giving a minimum temperature of 4° C. in the temperature gradient for the contact surface, a constant output of 390 g. of oxime per kwh. of light energy consumed can be obtained, without any deposits appearing after more than 300 hours' functioning. If the percentage of sulphuric medium is reduced to 10%, with the surface at this temperature, the reaction stops after the reactor has functioned for 14 hours, simply as the result of coloured deposits forming, and preventing proper transmission of the light energy to the reactive mixture.

EXAMPLE 2

The operation is carried out as in Example 1, but the percentage weight of sulphuric medium is varied so that the following conditions occur:

5% weight of sulphuric medium, containing 25% oxime and 75% aqueous sulphuric acid;
95% weight of organic medium consisting of a solution of 20% cyclododecane in carbon tetrachloride.

1,450 litres of water an hour are circulated through the casing, at 7° C. at intake and 17° C. at discharge. For the first seven hours, the output is 360 g. of oxime per kwh., then it drops hourly until it is 195 g./kwh. after 15 hours, as deposits increase.

Examination of deposits 3 mm. thick shows that they consist mainly of a solution of 46% oxime in sulphuric acid, containing impurities, and with a viscosity of 22.798 poises at 15° C.

EXAMPLE 3

The operation is carried out as in Example 2.

After 15 hours, it is found that the formation of tarry deposits has reduced production to 190 g./kwh.

Figure 2:
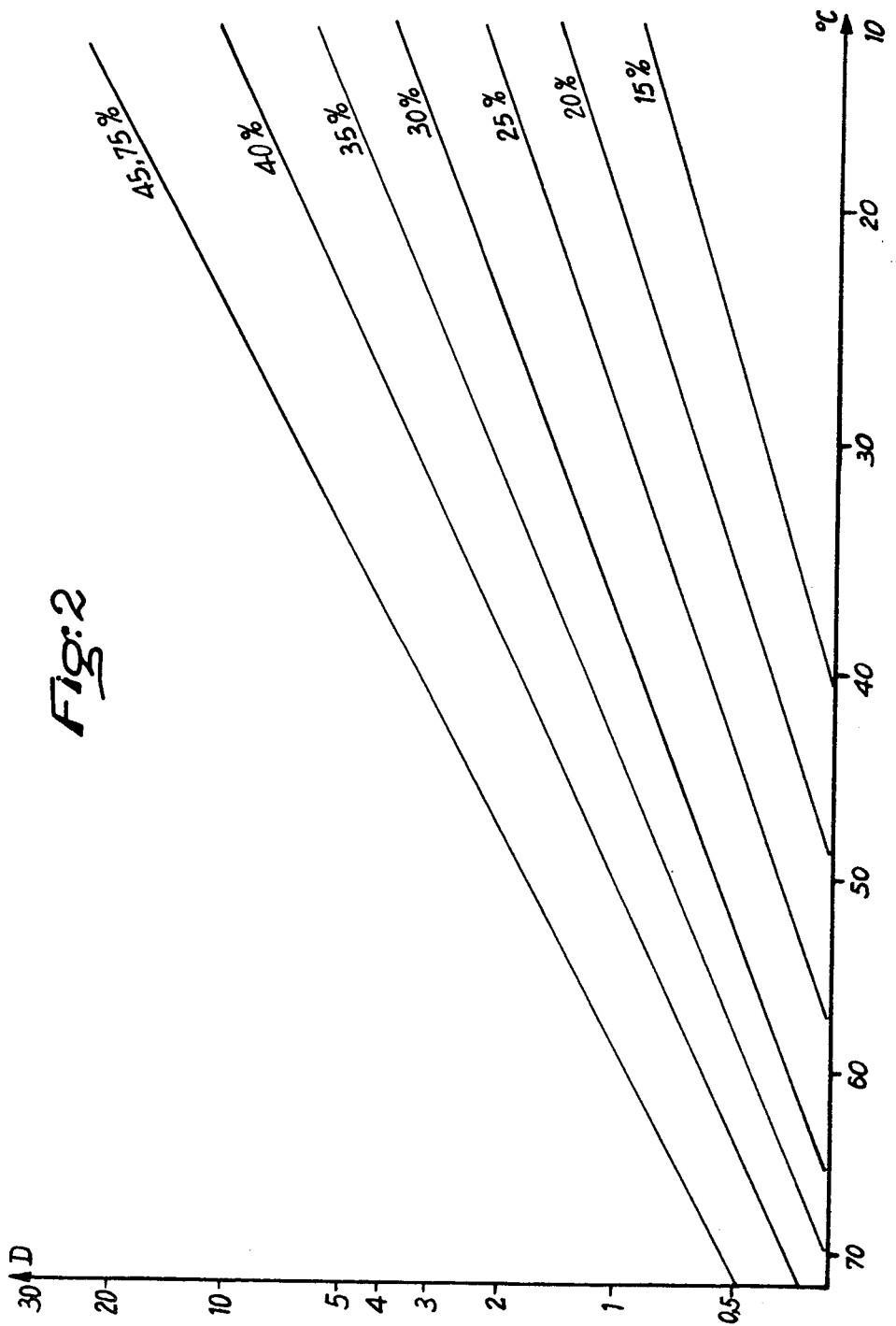

The temperature of the water at the casing inlet is then raised from 7 to 55° C., while maintaining the temperature of the reactive mixture at 15° C. Output increases gradually, and 6 hours after the start of heating of the casing surface reaches 390 g./kwh. The deposits have by then completely disappeared, and it is found that the variation in viscosity of degradable deposits in relation to temperature is very noticeable, as may be seen from Table III below and the curves in FIG. 2. In FIG. 2 the variation in the viscosity of solutions of various concentrations of oxime in aqueous sulphuric acid is shown in relation to temperature. Viscosities are shown in ordinates according to a logarithmic scale, and temperatures in abscissae according to an 1/T scale.

The viscosity of the viscous adherent layer is only 3.5 poises at 40° C., and at 60° C. it is close to 1 poise.

TABLE III.—VISCOSITIES IN POISES OF SOLUTIONS OF OXIME IN AQUEOUS SULPHURIC ACID

| Temp. (° C.) | 10 | 20 | 30 | 40 | 50 | 60 | 70 | 80 |
|---|---|---|---|---|---|---|---|---|
| Percent wt. oxime: | | | | | | | | |
| 15 | 1.07 | 0.69 | 0.45 | 0.3 | 0.204 | 0.146 | 0.105 | <1 |
| 20 | 1.8 | 1.1 | 0.67 | 0.42 | 0.28 | 0.19 | 0.132 | <1 |
| 25 | 2.75 | 1.64 | 0.98 | 0.62 | 0.39 | 0.26 | 0.177 | 0.126 |
| 30 | 4.83 | 2.73 | 1.57 | 0.94 | 0.58 | 0.375 | 0.23 | 0.182 |
| 35 | 7.8 | 4.2 | 2.3 | 1.3 | 0.77 | 0.472 | 0.29 | 0.19 |
| 40 | 13.7 | 6.9 | 3.52 | 1.9 | 1.05 | 0.625 | 0.37 | 0.225 |
| 45.75 | 33.5 | 15.2 | 7.1 | 3.5 | 1.8 | 0.96 | 0.53 | 0.31 |

EXAMPLE 4

The same operation is carried out as in Example 2, but from the beginning the casing is heated with water with an intake temperature of 60° C.

Throughout the duration of the test, which lasts 200 hours, output remains steady at 400 g./kwh. without deposits appearing on the contact surface.

EXAMPLE 5

The same operation is carried out as in Example 2, but from the beginning the casing is heated with water with an intake temperature of 95° C.

The test lasted 300 hours, giving a constant output of 400 g./kwh., without deposits appearing on the contact surface.

EXAMPLE 6

The operation is carried out as in Example 1, with 35% weight of oxime in the sulphuric medium and 15% weight of the sulphuric medium. The minimum temperature of the contact surface has to be higher than for 25% weight of oxime, and this is provided by raising the minimum intake temperature of the calorie-generating fluid to 15° C.

EXAMPLE 7

The operation is carried out as in Example 1, with 10% weight of sulphuric medium and 35% weight of oxime in this sulphuric medium. To maintain the same productivity, the temperature of the surface has to be raised, by raising the minimum intake temperature of the calorie-generating fluid to 35° C.

All these examples show that, with a suitable percentage of sulphuric medium and an appropriate temperature for the contact surfare, for a given oxime content in the sulphuric medium, any dirtying of the surface of the radiation source can be avoided, and the reaction allowed to continue without interruption.

These examples involve a single-lamp cylindrical reactor, but the present invention can also apply to multi-lamp reactors of all sizes, and of variable geometry.

What we claim is:

1. A process for the continuous preparation of an alicyclic oxime by adding a solution containing 75% by weight of nitrosyl sulfuric acid in sulfuric acid to a solution containing 20% by weight of a cycloalkane in carbon tetrachloride saturated with hydrogen chloride, accompanied by stirring and exposing the stirred reaction mixture to a light source to effect a photochemical reaction, the improvement comprises maintaining said light transmitting surface at a temperature not exceeding about 95° C. so as to reduce the viscosity of the adherent film of oxime deposited on said light transmitting surface.

2. A process in accordance with claim 1 wherein said cycloalkane is cyclododecane.

3. A process in accordance with claim 1 wherein the temperature maintained on said light transmitting surface is from 10 to 70° C. and the concentration of oxime in the sulphuric acid solution is from 15 to 35% by weight.

4. A process in accordance with claim 1 wherein the temperature of said light transmitting surface is maintained at from 10 to 70° C. and the sulphuric acid is present in said mixture in an amount between 4 and 15% by weight.

5. A process in accordance with claim 1 wherein maintenance of said light transmitting surface is effected by circulating a heated fluid inside and along the surfaces of said light transmitting surface.

References Cited

UNITED STATES PATENTS

| 3,578,575 | 5/1971 | Rigdon et al. | 204—162 XN |
| 3,537,964 | 11/1970 | Miwa et al. | 204—162 XN |
| 3,141,839 | 7/1964 | Metzger et al. | 204—162 XN |
| 3,060,173 | 10/1962 | von Schickh et al. | 204—162 XN |
| 3,309,298 | 3/1967 | Yoshikazu Ito et al. | 204—162 XN |

FOREIGN PATENTS

| 703,453 | 2/1965 | Canada | 204—162 XN |

CARL D. QUARFORTH, Primary Examiner

R. S. GAITHER, Assistant Examiner

U.S. Cl. X.R.

204—162 R